J. G. CALLAN.
FLOW CONTROLLING APPARATUS.
APPLICATION FILED MAY 19, 1917.
1,272,212.
Patented July 9, 1918.
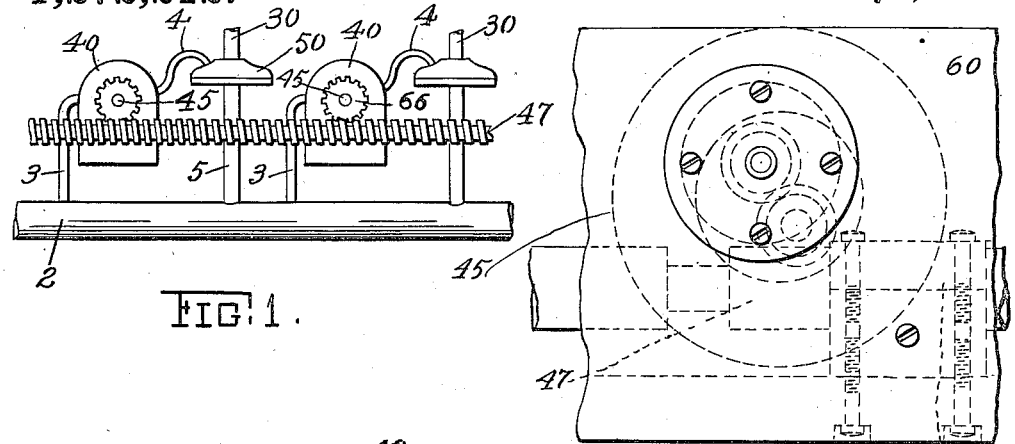
FIG. 1.
FIG. 4.
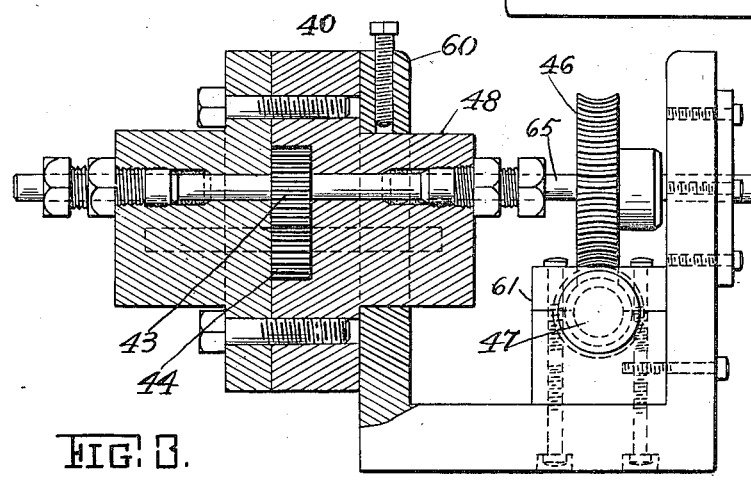
FIG. 3.
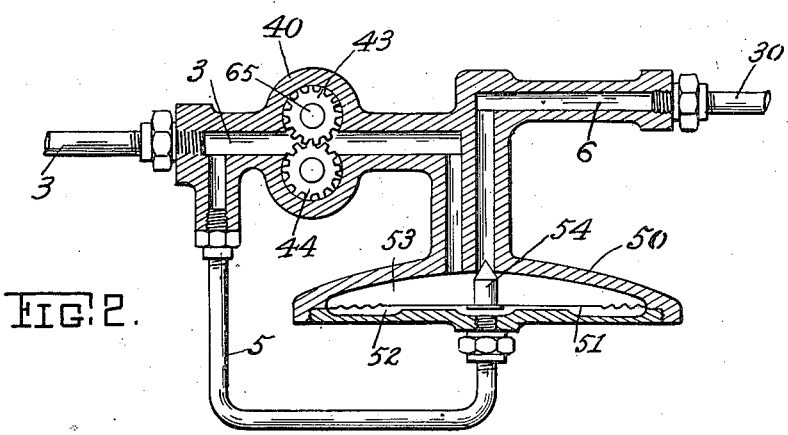
FIG. 2.
Inventor
John Gurney Callan
By Joseph P. Livermore
Attorney

UNITED STATES PATENT OFFICE.

JOHN GURNEY CALLAN, OF MADISON, WISCONSIN, ASSIGNOR, BY MESNE ASSIGNMENTS, TO CONSTANTINE HUTCHINS, DANIEL R. SORTWELL, AND ELIOT FARLEY, TRUSTEES, ALL OF BOSTON, MASSACHUSETTS.

FLOW-CONTROLLING APPARATUS.

1,272,212.      Specification of Letters Patent.      Patented July 9, 1918.

Application filed May 19, 1917. Serial No. 169,69_.

*To all whom it may concern:*

Be it known that I, JOHN GURNEY CALLAN, a citizen of the United States, residing in Madison, in the county of Dane and State of Wisconsin, have invented an Improvement in Flow-Controlling Apparatus, of which the following description, in connection with the accompanying drawings, is a specification, like numerals on the drawings representing like parts.

This invention relates to an apparatus for controlling the flow of fluids, the object being to maintain a determinate or uniform quantity rate of flow or discharge of fluid in varying conditions.

It is in some cases necessary to produce, as nearly as possible, a uniform quantity rate of discharge or flow of a fluid; or to obtain equal discharge rates, or discharge rates in some definite proportion between two or more delivery orifices or ducts receiving from the same source of fluid, and the present invention consists in an organization or combination of appliances by which such desired rate of discharge through one or more ducts or orifices may be maintained.

The principal components of the apparatus are a fluid measuring device, which may be, structurally considered, a pump, and is shown as a gear pump of usual construction, said pump being interposed between a source of fluid supply under pressure in excess of that required to deliver at the desired quantity rate, and the discharge duct or outlet through which the fluid is to be discharged at a definite quantity rate; and a pressure regulating device adapted to maintain substantially equal pressures at the inlet and discharge sides of the pump or measuring device, including a valve interposed between the supply and discharge ducts and controlled by the action of the measuring device automatically to reduce the pressure to that required for delivering at the desired quantity rate through the discharge duct.

Figure 1 is a diagrammatic view of an apparatus embodying this invention, comprising a plurality of discharge ducts connected with a single supply pipe, and having provision whereby the delivery through the several discharge ducts is at equal quantity rate, or is of uniform quantity rate through each regardless of the action of the others;

Fig. 2 is a sectional view showing the essential components of the means for governing the quantity rate of flow of the fluid; Fig. 3 is a sectional view through one of the pumps of an apparatus such as illustrated in Fig. 1; and Fig. 4 is a side elevation of the apparatus shown in Fig. 3.

In Fig. 1 the source of liquid the flow of which is to be controlled is shown as a main pipe 2 which contains liquid under sufficient pressure to discharge at the desired quantity rate through the various delivery ducts or orifices two of which are represented in Fig. 1 at 30.

The fluid passes from the main supply pipe 2 to each of the delivery pipes 30 through a branch supply pipe 3 leading to the measuring device 40 from which the fluid passes through the passage 4 to the pressure regulating device 50, which is also connected with the main supply pipe 2 by a branch pipe 5 for a purpose which will now be explained.

The construction and mode of operation of the measuring and regulating devices will be best understood in connection with Fig. 2 in which the supply pipe or branch 3 may be assumed, for example, to contain fluid at pressure of 100 pounds to the square inch, which is in excess of that needed to deliver the fluid through the discharge duct 30 at the desired quantity rate.

The apparatus is to be used where the conditions may be assumed to vary in the discharge duct 30 and parts intervening between the controlling apparatus and the point of final discharge, so that varying amounts of pressure might be required in the discharge duct to cause the fluid to be finally discharged at the desired volume rate. For example, 50 pounds pressure at the inlet end of the discharge duct 30 might be sufficient to cause the desired volume to be discharged at a given time, but by reason of possible variations in the condition of the conduit, or of the outlet, or of the fluid itself, it might be that a pressure of 60 or 70 pounds would be required in order to maintain the discharge at the proper volume rate.

An example of a use to which an apparatus of this kind may be put is where a fluid material is forcibly discharged through one or more orifices, and upon issuing therefrom solidifies to produce a filament, and the uniformity of discharge rate of the material through the orifice is a factor in the attainment of uniformity of size or gage of the filament.

In order to insure the desired volume rate of discharge, the measuring device 40 is used, said measuring device being shown in this instance as a usual form of gear pump, the gears 43, 44 of which are rotated at a definite rate in the direction of the arrows thereon and thus displace the liquid and carry it forward from the inlet passage 3 to the outlet passage 4 of said pump in a definite quantity per unit of time.

If there were no leakage in the pump, the said pump alone would suffice as a measuring device to carry the liquid forward so as to discharge it at the desired quantity rate so long as the pump was driven at uniform speed with adequate power, for if the pressure in the discharge passage had to be greater than that in the supply pipe 3, the pump itself would serve to produce such pressure to force the liquid forward, or if the pressure from the supply pipe 3 were in excess of that required to deliver the desired quantity through the discharge duct the pump would hold back the excess pressure and allow the liquid to pass only at the desired quantity rate.

Such use of a pump alone for delivering at a definite quantity rate is not, however, in all cases effective, owing to the leakage through the pump, which increases as the difference in pressure at the inlet and discharge side of the pump increases, and consequently, in order to insure the effective operation of the pump as an accurate measuring device, the pressure regulating device 50 is employed which is so constructed as substantially to equalize the pressures at the inlet 3 and outlet 4 of the pump 40.

The pressure regulating device 50 is shown as a diaphragm chamber containing a diaphragm 51 interposed between the chambers 52 and 53, said chamber 52 communicating by pipe 5 with the inlet 3 to the pump, and the chamber 53 at the other side of the diaphragm communicating with the pipe 4 which is the outlet or delivery duct of the pump, which in this case is interposed between the main supply pipe 2 and the pressure regulating device 50. If, therefore, the pressures in the chambers 52, 53, are kept substantially equal, the pressures at the inlet and discharge sides of the pump 40 are practically equalized so that there is no tendency for leakage through the pump, and the fluid is advanced by the pump from the passage 3 into the passage 4 at a definite quantity rate depending upon the capacity and speed of operation of the pump.

In order to maintain the pressures in the chambers 52, 53, of the equalizing device substantially equal and at the same time to produce in the delivery pipe 30 the proper pressure to deliver the liquid therethrough at the desired rate determined by the pump, the regulating device 50 comprises a valve 54 operated by the diaphragm 51 and controlling the communication from the main supply pipe to the delivery pipe.

In the arrangement shown in which the pump 40 is interposed between the supply pipe and the regulating device 50, the valve 54 is interposed between the chamber 53 and the delivery passage 30 and in any proper arrangement, said valve 54 operates as a throttle valve to hold back the excess pressure in the supply pipe, or to reduce the pressure in the delivery pipe 30, to just what is required to discharge the fluid therethrough at the desired quantity rate which is determined or measured by the pump 40.

Assume for example that the pressure in the supply pipe is 100 pounds, and that 50 pounds pressure in the delivery pipe will force out the liquid at the desired quantity rate, and assume first that the pump 40 is not in operation. Then if the valve 54 were unseated, the pressure in the chamber 53 could not exceed fifty pounds, and would thus be heavily overbalanced by the pressure in the chamber 52, which would seat the valve 54 tightly, so that there would be no discharge when the pump was not in operation, and the measuring function was not being performed.

Under such circumstances, leakage through the pump and discharge pipe 4 of the pump into the chamber 53 might approximately equalize the pressures on the diaphragm 51, but the valve 54 would probably remain seated, or in any event would prevent any escape of liquid into the discharge passage 6 in excess of that which could leak through the pump 40, and such leakage would be practically nothing owing to the practically complete balance of pressures at the inlet and outlet of the pump.

If now, the measured flow is to be established, the pump is set in operation and will carry the fluid forward from the inlet 3 to the outlet 4 of said pump at the established rate, and said fluid entering the chamber 53 will under the impelling force of the pump produce a very slight excess of pressure in said chamber 53, sufficient to unseat the valve 54 which will then permit the fluid to flow into the discharge pipe 30.

As soon, however, as the pressure in the discharge pipe 30 reaches the amount required to discharge the fluid at the rate at which it is supplied by the pump, say for example, the pressure of 50 pounds, the fluid will be discharged at the desired rate determined by the pump, and there will be no further increase in pressure in the chamber 53 so that said pressure will remain approximately equal to that in the chamber 52 or only very slightly in excess thereof, and consequently, the pressures in the inlet 3 and discharge pipe 4 of the pump will remain practically equal and the pump will therefore operate effectively to measure the quantity rate of flow of the liquid displaced by it in its movement.

If now the conditions at the discharge orifice or in the discharge pipe or in the fluid itself should vary so that it might require, for example, sixty pounds pressure in the discharge pipe 30, to force out the fluid at the desired quantity rate, the pressure in the chamber 53 would under the impulse of the pump increase slightly more and would open the valve 54 a trifle more until its throttling effect is sufficient to reduce the pressure from slightly above one hundred pounds in the diaphragm chamber 53 to a pressure of sixty pounds in the discharge passage 30 which would be sufficient to discharge the fluid at the desired quantity rate under the assumed conditions.

The extremely small increment or variation in pressure in the chamber 53 required to move the valve 54 to give the desired throttling effect under all conditions of the discharge passage 30 is insufficient to materially affect the balance or equilibrium of pressure on the pump 40, and the result of the coöperation of the several elements is that the fluid is under all conditions caused to flow through the delivery passage 30 at the quantity rate measured by the pump 40, and that said pump 40 runs in substantial equilibrium without itself producing any appreciable impelling force or pressure on the fluid, which at all times has available the pressure in the supply pipe 2 to insure a sufficient pressure to maintain the desired discharge, without imposing any impelling duty upon the pump.

A flow regulating device of this kind is applicable where a number of different delivery ducts 30 deliver from a common supply pipe 2 as shown in Fig. 1, and it is desired that each delivery pipe shall deliver at a predetermined quantity rate unaffected by the others.

As shown in Fig. 1, the delivery pipes are designed each to deliver at the same quantity rate, and the measuring devices or pumps 40 are alike, the driving shaft 45 of each being provided with a worm gear 46 actuated by a worm shaft 47 common to the entire series, so that all of the measuring devices will be driven at the same rate, and consequently will cause the fluid to be delivered at the same rate through the several delivery ducts 30.

The mechanical construction suitable for the measuring devices or pumps of a series of flow regulating appliances such as shown in Fig. 1, is represented in Figs. 3 and 4, in which the several pumps 40 are supported in a frame piece 60 which also supports bearings 61 for the worm shaft 47.

The body portion of the pump 40 is provided with a cylindrical hub 48 mounted in a recess in the frame piece 60, and as the driving shaft 45 of the gears 43, 44, of the pump is eccentric in said hub 48 this construction affords a ready means of adjustment of the driving worm gear 46 into proper mesh with the worm 47.

While the pressure controlling device 50 has been referred to as a diaphragm chamber containing a diaphragm, it is obvious that any suitable movable abutment subjected to the desired pressures at the two sides and operating by its movement to control the regulating valve might be used, and the invention is not limited to the mechanical details of the instrumentalities used.

It obviously is immaterial whether the measuring device or pump is in equilibrium in the pressure of the supply pipe 2 or in the pressure in the delivery pipe 30 so long as the pressure at the inlet and discharge sides of the pump is substantially equal, and the fluid delivered from the pump controls the operation of the regulating valve so that it serves to reduce the pressure in the supply pipe to that required in the delivery pipe for discharging the fluid therefrom at the rate determined by the action of the pump. The coöperation of the pump and regulating device is such that the pump serves to carry the fluid forward at a measured rate without imparting substantial pressure to or being subjected to substantial pressure from the fluid, while the regulating device serves to reduce the pressure in the supply pipe to a sufficient amount in the delivery pipe to effect the discharge therethrough at the rate determined by the pump.

The term "pump" is used simply because structurally considered the measuring device may be the same as a pump, although functionally considered it does not serve the usual purpose of a pump, namely, that of impelling a fluid against a substantial pressure, as is done in forcing a liquid from a lower to a higher level.

In the present case the measuring devices perform no appreciable work in carrying the fluid to its destination and they require for their operation only sufficient power to overcome the frictional and other incidental resistances to the movements of the parts, which are balanced or in equilibrium so far as the pressure of the fluid acting upon them, or acted upon by them is concerned.

The arrangement of the instrumentalities may be varied from that shown in Fig. 2, as it is not essential that the measuring device should be interposed between the supply pipe and the regulating device, or that the valve of the regulating device should be interposed between the outlet from the measuring device and the final discharge duct.

It is sufficient that the inlet and discharge ducts of the measuring device should communicate respectively with the chambers at the two sides of the movable abutment of the regulating device, and should both be on the same side of the regulating valve 54, and that the pressure in the discharge passage of the pump should act on said movable abutment in the direction to open the regulating valve 54, or to establish or increase the capacity of the communication from the main supply duct to the final delivery duct.

The pressure regulating device besides operating to maintain substantial balance of pressure on the measuring device and to reduce the pressure from the supply pipe to that required for discharging at the desired rate through the discharge pipe, also serves as an automatic stop valve for preventing the escape of the fluid from the supply pipe into the discharge pipe when the measuring device is not in operation as has already been explained.

Furthermore, if there should be any break or leakage in the delivery pipe 30 such as would tend to reduce the pressure therein, the valve 54 would immediately close sufficiently to hold back fully the pressure in the supply pipe, so that the only leakage or loss due to the defect in the discharge pipe would be at the normal rate measured by the pump, instead of the greatly increased flow that would result from the great reduction in back pressure if no regulating valve were present.

What I claim is:

1. In an apparatus for regulating the flow of fluids, the combination with a fluid measuring device adapted to receive fluid from a supply under pressure and to deliver said fluid, with a pressure regulating device adapted to equalize the inlet and outlet pressures of said measuring device.

2. An apparatus for regulating the flow of fluids, comprising a fluid measuring device adapted to transfer fluids from its inlet to its outlet at a definite quantity rate, and a pressure regulating device comprising a valve and a movable abutment subject at opposite sides to the pressure at the inlet and outlet sides of the measuring device, said pressure regulating device operating to maintain said pressures substantially equal, while permitting the fluid to be discharged through said valve at the rate determined by said measuring device.

3. In an apparatus for regulating the flow of fluids, the combination of a fluid measuring device, with a pressure regulating device comprising a movable abutment and a valve operated thereby, and ducts establishing communication between the inlet and discharge sides of said measuring device with the regulating device at opposite sides of said movable abutment; pressure from the discharge passage of the regulating device on said movable abutment tending to open said valve, and said valve being interposed between a main supply duct and a delivery duct, substantially as described.

4. A flow controlling apparatus interposed between a supply pipe for fluid under a relatively high pressure and a discharge duct through which the fluid is discharged under a relatively low pressure, said flow controlling apparatus comprising a flow measuring device for advancing the fluid from its inlet to its outlet at a definite quantity rate; and a pressure regulating device comprising a chamber and movable abutment therein, said chamber being in communication with the inlet and outlet ducts of the measuring device at opposite sides of said movable abutment respectively; and a valve operated by said movable abutment and controlling the communication from the main supply to the main discharge pipe of the apparatus, pressure from the discharge side of the measuring device tending to open said valve, whereby the pressures at the inlet and discharge sides of said measuring device are maintained substantially equal, and said valve permits a flow from the main supply to the main discharge duct at the rate determined by the measuring device, substantially as described.

5. An apparatus for regulating the flow of fluids comprising a measuring device adapted to be power driven at a determinate speed, to transfer fluid from its inlet to its outlet; and a pressure regulating device adapted to maintain substantially equal pressures at the inlet and outlet sides of said measuring device.

In testimony whereof I have signed my name to this specification.

JOHN GURNEY CALLAN.